United States Patent [19]
Hilston et al.

[11] Patent Number: 5,437,940
[45] Date of Patent: Aug. 1, 1995

[54] HIGH POWER ENERGY COMPRESSION DEVICE

[75] Inventors: Michael D. Hilston, Painesville, Ohio; Neil C. Otto, Chicago, Ill.

[73] Assignee: Westinghouse Electric Corp., Pittsburgh, Pa.

[21] Appl. No.: 918,479

[22] Filed: Oct. 14, 1986

[51] Int. Cl.$^6$ .......................................... G03G 13/06
[52] U.S. Cl. ................................. 429/103; 429/112; 429/210; 29/2
[58] Field of Search ................ 429/50, 103, 112, 153, 429/210; 204/266; 29/2

[56] References Cited

U.S. PATENT DOCUMENTS

| | | | |
|---|---|---|---|
| 3,933,520 | 1/1976 | Gay et al. | 429/103 |
| 4,057,678 | 11/1977 | Walker, Jr. | 429/103 X |
| 4,086,155 | 4/1978 | Jonville | 204/266 |
| 4,188,707 | 2/1980 | Asano et al. | 29/571 |
| 4,200,686 | 4/1980 | Fletcher | 429/112 |
| 4,208,473 | 6/1980 | Bradley | 429/112 |
| 4,233,378 | 11/1980 | Joo et al. | 429/220 |
| 4,382,117 | 5/1983 | Kunze | 429/132 |
| 4,450,214 | 5/1984 | Davis | 429/194 |
| 4,849,309 | 7/1989 | Redey et al. | 429/50 X |
| 4,851,306 | 7/1989 | Kaun et al. | 429/112 |

OTHER PUBLICATIONS

Gibbard, H. F., "Ultra-High-Power Batteries", undated abstract, p. 191.
Kapitza, P. L., "A Method of Producing Strong Magnetic Fields", Proceedings of the Royal Society 105, 1924, pp. 691–710.
McCoy, L. R., Saunders & Heredy, "Secondary Lithium-Metal Sulfide Battery", 26th Power Sources Symposium, Apr. 29–May 2, 1974 PSC Publications, pp. 68–71.
Searcy, J. Q. & Armijo, "Thin Cell Technology for Li(Si)/FeS$_2$ Thermal Batteries", Thermal Batteries Session, pp. 27–30.
Vissers, D. R., Tomczuk & Steuenberg, "A Prelim. Investigation of High Temp. Lithium/Iron Sulfide Sendry. Cells", J. Elec. Soc., May, 1974, pp. 665–667.
Winchester, C. S., "The LAN/FeS$_2$ Thermal Batttery System", Thermal Batteries Session, pp. 23–26.
"Lithium Metal Sulfide High-Pulse-Power Batteries", slides presented May 20–21, 1985, Cleveland, Ohio.

*Primary Examiner*—Peter A. Nelson
*Attorney, Agent, or Firm*—D. Schron

[57] ABSTRACT

An energy compression device includes at least one bipolar element comprising a positive electrode formed of cobalt disulfide, a negative electrode formed of a lithium alloy, an inert porous separator disposed between and in contact with the electrodes, and a lithium cation salt dispersed through the separator and in contact with, and preferably dispersed through, the electrodes.

43 Claims, 2 Drawing Sheets

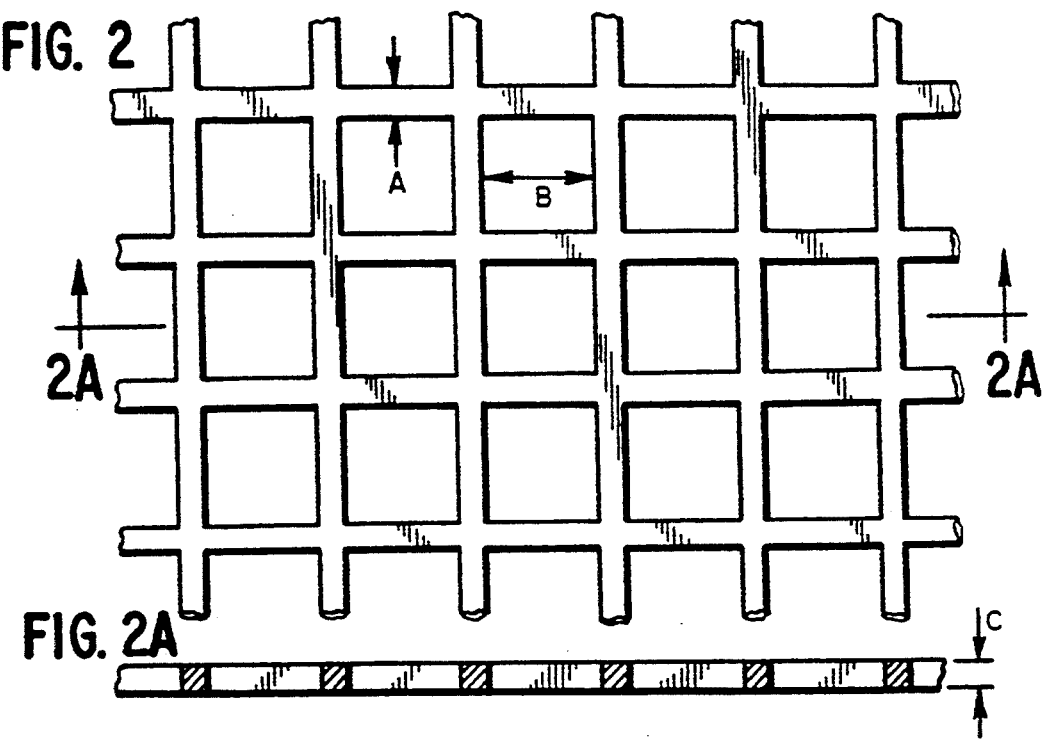
FIG. 2
FIG. 2A
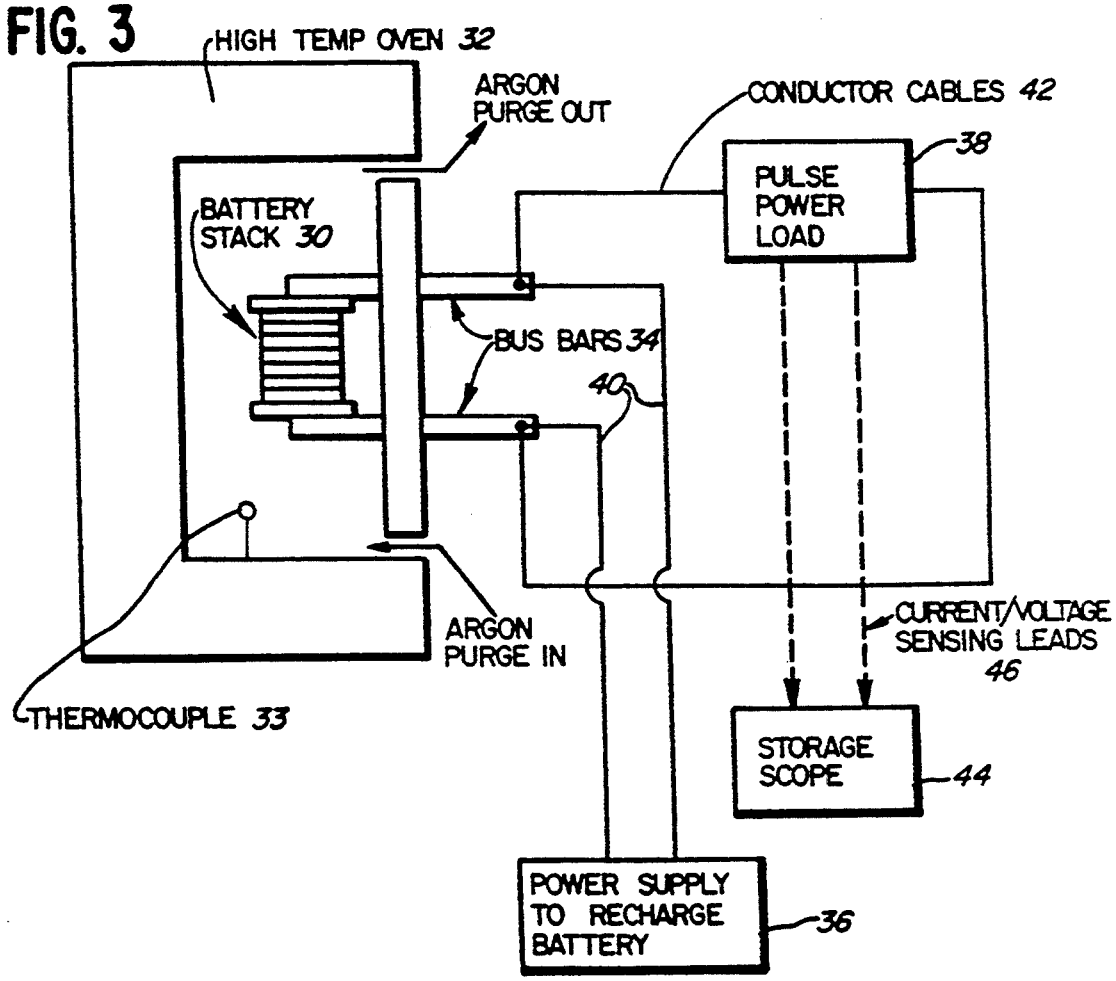
FIG. 3

HIGH POWER ENERGY COMPRESSION DEVICE

BACKGROUND OF THE INVENTION

1. Field of the Invention

This invention relates generally to devices that are capable of delivering high-energy electrical pulses of very short duration.

2. Description of Related Art

Very large energy pulses (of the order of $10^6$ Joules) of short duration (of the order of milliseconds) are required for commercial applications such as welding and igniting fusion reactors and for defense applications such as electromagnetic rail guns, laser weapons, and active sonars. Many applications, particularly those involving space-based or mobile terrestrial power systems, require lightweight and/or low volume power sources.

There is also need for power sources which can supply electrical energy pulses of varying duration, over the range from microseconds to seconds. Moreover, it is desirable to vary the voltage of the power source over wide limits, e.g. from 50 to 1000 V or more, depending on the application.

A further requirement for some applications is the ability to deliver a rapid series of electrical pulses, for example, five pulses per second in the case of an electromagnetic hypervelocity launcher. Another desirable feature of a high-power pulse source is the ability to sustain nearly constant voltage for the duration of each high-current pulse.

Presently, high energy pulses of electrical power are typically provided by a large bank of capacitors or by a homopolar generator (HPG). Although capacitors can deliver pulses of relatively high power per unit mass (e.g. 100 kW/kg), their specific energy is typically only in the range of 0.1 to 2 kJ/kg. Thus, capacitors require a high mass (and consequent high volume) and are thus limited in their applicability. Moreover, the voltage of capacitors typically declines exponentially with time during discharge. This rapid decline significantly complicates the design of the equipment which uses the power pulses.

The HPG is a flywheel of conductive material rotating at high speed in a strong magnetic field which produces electric current. The HPG typically has specific energy of 2 to 10 kJ/kg with specific power of the order of 100 kW/kg. While the HPG is capable of delivering megaampere pulses, the shortest pulse length is of the order of 200 milliseconds and the HPG is limited to a maximum of several hundred volts. The HPG has other limitations which affect its use: it is an expensive machine having moving parts requiring repair or replacement; it is constructed of copper, iron, and other structural materials making it heavy and thus expensive for space-based applications; and the gyroscopic action of the HPG makes movement and guidance in a space-based system difficult.

Batteries, which have specific energies in the range of 100 to 750 kJ/kg, surpass HPGs and capacitors by two orders of magnitude or more in specific energy. The volumetric energy density of batteries shows similar gains over other energy storage technologies. Batteries can supply power pulses with durations ranging from the microsecond region (similar to capacitors) to the millisecond region (similar to HPGs) and beyond. Series-connected batteries can be built with any integer multiple of the single-cell voltage and thus are not limited to low-voltage operation as is an HPG, or high-voltage operation as are capacitors. A battery can supply identical, rapid, repetitive pulses without recharge.

Despite these advantages, battery power sources have not been widely used in high-power, pulsed modes of operation because the specific power of conventional batteries is far too low, typically around 0.1 to 1 kW/kg. Low specific power is the result of the use of electrochemical systems with slow electrode kinetics, electrolytes with low conductivity and battery designs with large cell and intercell resistances.

The limitations of conventional battery systems can be eliminated or significantly reduced by the use of a high-temperature, molten-salt secondary battery of bipolar construction. In particular, lithium alloy, metal sulfide (Li-MS) batteries with molten alkali halide electrolytes have been shown to be capable of meeting the current densities required of high-power pulse batteries.

Power in a battery of essentially ohmic character is given by:

$$P = (V_o - IR_i)I \tag{1}$$

where the open circuit voltage $V_o$ and the effective internal battery resistance $R_i$ are, in general, functions of the state of charge.

Differentiating the expression with respect to I at a particular state of charge gives $$\partial P/\partial I = V_o - 2IR_i \tag{2}$$

At maximum power $\partial P/\partial I = 0$, so that $$V_o/2R_i = I. \tag{3}$$

Equation (3) shows that for a battery whose polarization losses are minimal the current at maximum power varies directly as the open-circuit potential and inversely as the internal resistance. A well designed Li-MS battery will approach these conditions.

The open-circuit potential depends on the thermodynamics of the electrochemical cell reaction; it lies in the range of about 1 volt to 4 volts for all known practical battery systems. Battery current, and consequently battery power, is thus predominantly controlled by the internal resistance, which can vary by several orders of magnitude depending on the design and construction of the battery. Decreasing the internal resistance increases current and power.

The measured internal resistance of a battery can be considered as the sum of three components: the electronic resistance of the current collectors, the ionic resistance through the battery electrolyte, and other resistive elements related to the electrochemical kinetics of the cell reaction. These resistive components are essentially series in nature so each individual component must be as low as possible to provide minimal internal resistance.

Electronic resistance can be minimized by adopting a series-bipolar configuration. Most batteries use a flooded electrolyte or have other mechanical properties which complicate the use of a bipolar construction. Li-MS, on the other hand, is ideally suited for bipolar construction, and several experimental bipolar batteries have been assembled and tested by Gould Inc. (Rolling Meadows, Illinois) with good results.

Reducing the ionic resistance of the cell requires a high-conductivity electrolyte. Molten salts have the highest conductivity of any electrolyte. The conductivities of the lithium halide salts used in a Li-MS cell are five times higher than of the sulfuric acid electrolyte used in lead-acid batteries, which has the best conductivity of conventional batteries.

Because the rates of electrochemical processes increase exponentially with temperature, the high operating temperature of a Li-MS cell results in extremely fast electrode reaction kinetics. The apparent cell resistance associated with electrochemical activation polarization is thus negligible in comparison with the electrolyte resistance. However, concentration polarization effects may be observed depending on the cell design and composition and construction of the electrodes.

No other battery system has this combination of attributes to produce high power density. This can be seen in the recent development of molten-salt, primary, thermal batteries built for missile and nuclear weapon applications.

For example, C. S. Winchester describes a LAN/-$FeS_2$ thermal battery system in the *Proceedings of the 30th Power Sources Symposium*, Electrochemical Society, Inc., Jun. 7-10, 1982, pp. 23-27. The LAN anode is a mixture of lithium and an ultrafine metal powder; the electrolyte is a mixture of LiCl and KCl. Current densities achieved by the LAN/$FeS_2$ cell at an operating temperature of 750° C. ranged from 0.99 A/$cm^2$ to 11.7 A/cm2 with peaks of 16.5 A/$cm^2$ and 14.5 A/$cm^2$. Specific power for the LAN/$FeS_2$ battery was almost 2.7 kW/kg.

J. Q. Searcy and J. R. Armijo describe a thin cell Li(Si)/$FeS_2$ thermal battery in the *Proceedings of the 30th Power Sources Symposium*, Electrochemical Society, Inc., Jun. 7-10, 1982, pp. 27-30. They developed a thin cell Li(Si)/$FeS_2$ thermal battery to replace Ca/Ca$CrO_4$ in applications requiring small batteries. The electrolyte used was a LiCl-KCl mixture, and the cell achieved a specific power of nearly 3.4 kW/kg.

While the power performance of each of these batteries is better than those of conventional batteries, the specific power still is not near that required for applications such as advanced weapons. Moreover, these batteries are primary batteries and the lack of rechargeability severely limits their applicability.

SUMMARY OF THE INVENTION

It is an object of the invention to overcome one or more of the problems described above.

According to the present invention, an energy compression device comprises at least one bipolar element including a positive electrode, a negative electrode and an inert separator disposed between and in contact with the electrodes is provided. The inert separator contains a lithium cation salt electrolyte which is in contact with and preferably dispersed through both electrodes. The inventive device also includes means for collecting current discharged from the device.

The negative electrode comprises a lithium alloy, and the positive electrode comprises an active material consisting essentially of cobalt disulfide ($COS_2$).

In preferred form, the inventive device comprises a plurality of such bipolar elements arranged in a stack within an enclosure, with an electrically conductive current collector between adjacent bipolar elements and communicating with respective pairs of current distribution means and associated terminals at opposite ends of the stack.

The device is adapted to be operated at a temperature which is sufficiently high to liquefy the electrolyte.

By means of the inventive energy source, it is possible to deliver large energy pulses of short duration at high power per unit mass. The inventive device is capable of delivering both high voltage and high current, and may deliver megaampere pulses of millisecond duration at specific power levels on the order of several hundred kW/kg. The inventive device is also capable of providing current densities of well more than 100 A/$cm^2$, e.g. on the order of 200 A/$cm^2$.

Other objects and advantages of the invention will be apparent to those skilled in the art from a review of the following detailed description, taken in conjunction with the drawings and the appended claims.

BRIEF DESCRIPTION OF THE DRAWINGS

FIG. 2 is a schematic depiction of the construction of one embodiment of a separator used in accordance with the invention.

FIG. 3 is a schematic depiction of one embodiment of a system for operating the device of the invention.

DETAILED DESCRIPTION OF THE INVENTION

Figure 1:
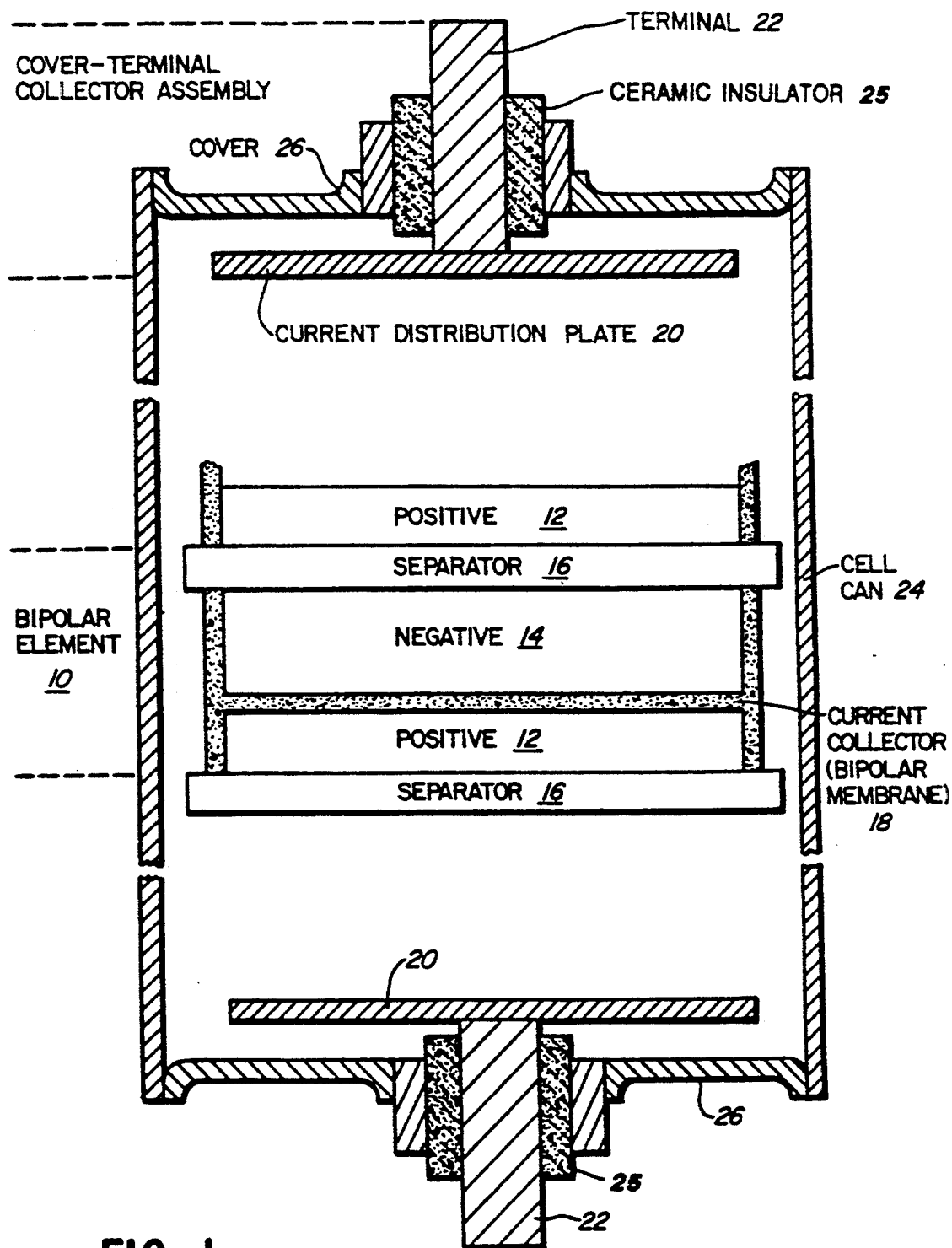
FIG. 1 is a schematic depiction of a series-bipolar stack battery made according to the invention.

To achieve very large current pulses of very short duration, an energy compression device is needed. An energy compression device takes power from a primary source, such as a generator, over a relatively long period of time (e.g., seconds to minutes) and delivers it in very short, very high power pulses, in effect compressing the energy.

To achieve the foregoing and other objects, an energy compression device made according to the invention may comprise: at least one, and preferably a plurality of bipolar elements arranged in a stack. Each bipolar element includes a current collector, a negative electrode, a porous electrolyte-containing separator, and a positive electrode. The negative electrode is formed of a lithium alloy such as LiSi, LiAl, LiAlSi, or LiAlFe. The positive electrode is formed of $CoS_2$ and the electrolyte is substantially an all-lithium-cation salt such as one or more lithium halides. The device is operated at a temperature sufficiently high to liquefy the electrolyte.

The present invention achieves current densities of greater than 100 A/$cm^2$ and can be operated as a standalone device or as a converter connected between a primary power source and a load. The present invention has a specific power of at least several hundred kW/kg (e.g. up to 500 kW/kg) in a pulse or series of pulses from 1 microsecond to 10 second duration.

The present invention is constructed in the form of one or more bipolar elements 10 as shown in FIG. 1. Each bipolar element 10 consists of a positive electrode 12 and a negative electrode 14 separated by a separator 16. Each component of the bipolar element 10 is thin to minimize resistance, and preferably is constructed to have large surface area per unit of mass.

Where a plurality of bipolar elements are stacked within an enclosure, as is preferred, current flows from cell to cell through a thin metallic membrane 18 (referred to variously as a "current collector" or "bipolar membrane"). The membrane 18 preferably comprises a highly electrically conductive metal such as molybdenum. Massive current distribution plates 20 and associated terminals 22 are provided only at the positive and negative ends of the stack, which is enclosed in a cell can 24. As is known in the art, each terminal 22 extends through a ceramic insulator 25 which is fixed in a respective can cover 26.

The number of bipolar cells within the cell can 24 determines the overall device voltage. An energy compression device as described herein may have from one up to several thousand bipolar elements 10. Each bipolar element 10 may provide a current density of well over 100 A/cm$^2$.

Each of the positive electrode 12, the negative electrode 14, and the separator 16 is formed of a porous body of active material (in the case with the positive and negative electrodes) or inert material (in the case of the separator) through which an electrolyte is dispersed.

The negative electrode comprises a lithium alloy or compound such as LiSi, LiAl, LiAlSi or LiAlFe, for example. A preferred lithium alloy is LiAlSi which is formed of 4 parts by weight of LiAl and 1 part by weight of $Li_{4.4}Si$. (The addition of silicon to the standard LiAl negative electrode is known to improve performance under high current load.) Other proportions of Li, Al, and Si can be used.

The standard procedure for forming such an electrode consists of loose-packing or cold-pressing powders of the mixed active and electrolyte compounds optionally followed by sintering under pressure to form a low-resistance bond to the current collector. Preferably, for example, a powder mixture of LiAl is pressed to a density of 75–80 volume percent of LiAl which gives maximum capacity with minimal expansion of the bed, thus preventing electrical shorting of closely spaced electrodes 12 and 14. The balance of the negative electrode 14 is filled with a lithium salt electrolyte, which is generally present during the pressing operation.

For example, a lithium alloy (e.g. LiAl, LiSi or LiAlSi) may be ground to a fine particle size and blended with a solid lithium halide electrolyte such as a mixture of LiF, LiCl and LiBr containing 22, 32 and 46 mole %, respectively. The blend is pressed into a pellet by application of pressure, typically of at least about 1500 lb/cm$^2$ in a die.

The thickness of the separator 16 is important in determining overall cell resistance. The separator 16 must be as thin as possible, e.g. less than 25 mils with a preferred thickness of about 0.1 to 15 mils. Excellent results have been obtained with separator thicknesses on the order of 8–9 mils. The separator preferably comprises at least about 65 weight percent electrolyte.

FIG. 2 shows a design for a thin separator construction which also permits the separator space to be filled with a maximum amount of electrolyte. In FIG. 2, an open mesh design is shown having fiber width A, fiber thickness C, and open dimension B. The open mesh is preferably formed of BN or yttria fiber and permits good contact of electrolyte with the electrodes, yet assures separation of the positive and negative electrodes 12 and 14.

Thin, solid, parallel strips (not shown), which are preferably formed of MgO, can be used as an alternative to the fiber mesh. Alternatively, a powder separator can be used consisting of compacted fine particles of one or more of MgO, BN, AlN or another inert, electrically insulating compound filling 20–40 percent of the separator volume, with electrolyte filling the remainder.

For example, a ground, fused and reground mixture of MgO (15–60 wt. %) and electrolyte (85–40 wt. %) may be formed into a pellet by application of pressure of 1500 lb/cm$^2$ or more in a die.

The choice of electrolyte also has an effect on the cell resistance. The thermal battery systems described earlier use a LiCl.KCl eutectic electrolyte. Many compositions of alkali-halide salt mixtures have been investigated for use in lithium alloy-metal sulfide batteries. Much of the early work was performed using electrolytes consisting of a eutectic mixture of LiCl and KCl or variants richer in LiCl than the eutectic composition. Both theoretical and experimental studies have shown the possibility of compositional changes in this electrolyte in the separator and within the electrode pores. Even at current densities much lower than those achieved here, these changes can result in precipitation of solid phases (e.g., LiCl in the pores of the negative electrode) leading to deterioration of cell performance.

This problem may be eliminated by the choice of an all-lithium-cation electrolyte. Two preferred electrolyte compositions are LiF-LiCl-LiBr (22-32-46 mole percent, M.P. 445° C.) and LiF-LiCl-LiI (11.7-29-.1-59.2 mole percent, M.P. 340° C.) mixtures. The first electrolyte is preferred in spite of its higher melting temperature, because of the difficulty of purifying highly hygroscopic LiI. The electrical conductivity of the preferred electrolyte, calculated using correlations based on the conductivity of the pure constituent salts, ranges from 4.5 Ohm$^{-1}$cm$^{-1}$ at 450° C. to 5.7 Ohm$^{-1}$cm$^{-1}$ at 650° C. An electrolyte of this conductivity can support a cell current density of 100 A/cm$^2$ or more with a voltage drop of less than 1 V, through a separator of thickness 0.25 mm (10 mils).

The positive electrode, according to the present invention, comprises an active material consisting essentially of cobalt disulfide ($CoS_2$). (As described below, minor amounts of active additives such as FeS may be added in order to facilitate thermal management of the cell.)

The positive electrode is prepared in a manner very similar to that of the negative electrode. $CoS_2$ is ground to a fine particle size and blended with solid electrolyte (e.g. 40–90 wt. % $CoS_2$, balance electrolyte) and then pressed (with or without fusion) into a pellet in a die at a pressure of about 1500 lb/cm$^2$ or more.

In the copending, commonly assigned U.S. patent application Ser. No. 772,118 filed Sep. 3, 1985 in the names of Neil C. Otto and H. Frank Gibbard and entitled "High Current Energy Compression Device" the use of FeS, $FeS_2$, $FeS_2$—$CoS_2$ solid solution, or NiS as an active material in a positive electrode is disclosed. The cell of the Otto, et al. application is disclosed as providing megaampere pulses of millisecond duration at a specific power on the order of 100 kW/kg, with current densities on the order of 25–100 A/cm$^2$. The Otto, et al. cell is disclosed as providing a specific power of at least 25 kW/kg in a pulse or series of pulses from one microsecond to ten second duration.

According to the present invention, due to the use of a positive electrode active material consisting essentially of $CoS_2$, it has been found that significantly higher current densities, power densities and specific power levels are obtainable compared to other high-current energy compression devices, including those of the Otto, et al. application, under identical conditions.

In substituting $CoS_2$ for FeS or $FeS_2$, one skilled in the art will appreciate that the amount of $CoS_2$ used is selected such that it contains a sufficient number of electrochemical equivalents to react with available lithium in the lithium alloy negative electrode.

One or more of FeS, NiS or CoS may be physically blended with $CoS_2$ and the electrolyte during formation of the positive electrode. Each of FeS, NiS and CoS exhibits exothermic properties during reduction which occurs during cell discharge, unlike $FeS_2$, for example, which may exhibit endothermic properties under some conditions of discharge, primarily slow rate discharge approaching reversability.

Judiciously selected amounts of these materials may be added to the $CoS_2$ to aid in thermal management. However, it should be noted that the desirable properties exhibited by the $CoS_2$ positive electrode will decrease as the amount of exothermic additive is increased. In any case, $CoS_2$ will always form a major proportion of the positive electrode.

After formation of the negative electrode, separator and positive electrode pellets, the separator pellet 16 is inserted between the negative and positive electrode pellets 14 and 12, respectively, and the three pellet stack is then clamped between current collector plates 18, as shown in FIG. 1. If more than one three pellet stack is employed, a thin, electrically conductive bipolar membrane 18 is inserted between each stack, with massive current distribution plates 20 disposed at either end of the stack.

It should be recognized that, if desired, the components of the bipolar element 10 may be formed stepwise by consecutive pressing of component-forming materials in a single die. If so, care should be taken to remove any edgewise smearing or other contact between the positive and negative electrodes.

The device will operate at an elevated temperature, e.g. 350° C.–650° C., the preferred range to liquefy the electrolyte. Care must be taken to remain below the melting point of the lithium alloy negative electrode. Various existing thermal management schemes are available to control the temperature.

FIG. 3 illustrates a system for charging, discharging and observing the performance of the inventive device. As shown in FIG. 3, the entire battery stack or single cell, generally designated 30, is placed in a high temperature oven 32. The oven is either purged with an inert gas such as argon or, if desired, the oven 32 and stack 30 can be placed in an inert atmosphere glove box.

The oven 32 is brought to a temperature (monitored by a thermocouple 33) above the melting point of the electrolyte and the battery stack 30 remains in the oven until the temperature of the entire stack is substantially uniform.

The respective terminals 22 (not shown) of the stack 30 are connected to respective bus bars 34 which are connected both to a power supply 36 and to a pulse power load 38 by appropriate electrical connections 40 or 42, respectively. For experimental purposes, the pulse power load is operatively connected to a storage oscilloscope 44 by current/voltage sensing leads 46.

When the entire battery has reached thermal equilibrium and all electrolyte contained within the separators and electrodes is molten, the battery is discharged through the pulse power load 38 and the electrical output characteristics are measured and stored by the oscilloscope 44. Discharge pulse duration is generally between one millisecond and 200 milliseconds.

After discharge, the power supply is utilized to recharge the battery stack 30. This typically occurs after between about 1% and 80% of the cell capacity has been discharged.

In the Figures, switches and associated hardware are not illustrated for simplicity.

EXAMPLES

The following specific examples are given to more clearly illustrate the practice of the invention, but are not to be regarded as limiting in any way.

Example 1

A 1.27 $cm^2$ surface area cell was fabricated by employing a 28 mil thick $CoS_2$ positive electrode, a 9.3 mil MgO/electrolyte separator, and a 31 mil Li-Al (20 wt. % Li) alloy negative electrode. The electrolyte consisted of the following ternary composition: LiCl (22.03 wt. %), LiF (9.56 wt. %) and LiBr (68.41 wt. %). The above individual elements comprising this cell were prepared as follows:

| Positive Electrode - | $CoS_2$ - | 77 wt. % |
|---|---|---|
| | Electrolyte - | 23 wt. % |
| | Total wt.: | 0.314 g |
| Separator - | MgO - | 35 wt. % |
| | Electrolyte - | 65 wt. % |
| | Total wt.: | .06 g |
| Negative Electrode - | LiAl alloy - | 65 wt. % |
| | Electrolyte - | 35 wt. % |
| | Total weight: | 0.2 g |

To prepare the assembly into a complete cell, the positive electrode blend was first placed into a die and pressed at 10,000 lb. Without removing the pressed positive electrode pellet, the separator mixture was uniformly placed on top and this assembly pressed again at 10,000 lb. Finally, on top of the separator, the negative electrode mixture was placed into the die and the assembly was pressed at 8000 lb. Thus, an entire pellet was pressed consecutively in the die in three separate steps without removing the previously pressed elements.

After the resulting assembly was removed from the pressing die (total wt.=0.574 g) the entire pellet was inspected to insure that the MgO separator was intact around its edges and that $CoS_2$ and LiAl were completely separated from each other (i.e. no smearing along the edges). Where necessary, the edge of the pellet was carefully scraped clean with a razor to be certain there were no short circuits.

For completeness, the following particle size distribution data were measured for the positive electrode and separator materials:

| | Sieve Size (Tyler) | Wt. % | Comments |
|---|---|---|---|
| $CoS_2$ Powder | +100 | 13 | None |
| | −100/+ 270 | 37 | |
| | −270/+ 400 | 17 | |
| | −400 | 33 | |
| MgO/Electrolyte Mixture | −200 | 100 | To insure wettability, the Mgo (submicron size) and electrolyte powders were first fused and then reground. This reground mixture was used to fabricate the separator. |

The completed pellet was bolted between two molybdenum current collectors and placed in an oven purged with argon to provide an inert environment. The entire cell assembly was brought up to 490°–500° C. and discharged into an adjustable FET load. The following data were collected over several successive pulses. In each case, the total length of each pulse was 35 milliseconds.

| Pulse No. | Time ($\mu$ sec) | Voltage (V) | Current (A) | Curr. Dens. (A/cm$^2$) | Specific Power (kW/kg) |
|---|---|---|---|---|---|
| 1 | 830 | .998 | 148.0 | 116.81 | 257.3 |
| 2 | 850 | .998 | 164.7 | 130.0 | 286.4 |
| 3 | 880 | 1.008 | 183.3 | 144.7 | 321.9 |

This example illustrates the high specific power and multiple pulse capability of the LiAl/CoS$_2$ systems of the invention.

Example 2

The following example compares otherwise identical cells operated under substantially identical conditions but differing in the identity of the positive electrode active material.

In each of the following three tests, a bipolar assembly was prepared as described in Example 1, above. One test used an assembly including a 28 mil positive electrode weighing 0.314 g and consisting of CoS$_2$ mixed with electrolyte (23.0 wt. %). In a second assembly, an FeS positive electrode (22.0 wt. % electrolyte) 24 mil thick and weighing 0.22 g was used. In a third test, an FeS$_2$ positive electrode (20.4 wt. % electrolyte) 31 mil thick and weighing 0.294 g was used.

In each assembly, the molar ratio of the metal sulfide or disulfide in the positive electrode to lithium present in the negative electrode was 0.52 to 1. (In each case, 0.00195 moles of the metal sulfide or disulfide were present in the positive electrode.)

Results of discharge tests of each cell are shown below. Measurements were taken at peak power points of the discharge curve in each case.

| Positive Electrode Material | Time Of Data Point ($\mu$ sec) | Pellet Voltage (V) | Current Density (A/cm$^2$) | Power Density (W/cm$^2$) | Specific Power (kW/kg) |
|---|---|---|---|---|---|
| CoS$_2$ | 880 | 1.008 | 145 | 146 | 322 |
| FeS | 900 | 1.224 | 69 | 84 | 222 |
| FeS$_2$ | 860 | 1.094 | 43 | 47 | 109 |

The foregoing example illustrates the significantly higher current density, power density and specific power obtainable according to the invention as compared to otherwise identical cells under identical conditions, differing only in the positive electrode active material.

The foregoing detailed description is given for clearness of understanding only, and no unnecessary limitations should be understood or inferred therefrom, as those skilled in the art will recognize modifications falling within the scope of the invention.

For example, battery electrode pellets may be formed in a variety of ways, e.g. by plasma spraying, roll pressing, die pressing, in situ electrochemical formation, vapor deposition, slurry deposition, etc.

Furthermore, the parameters of electrode and separator formation may be varied over a wide range. These parameters include particle size and shape distribution, electrolyte type, weight percent and composition of materials, electrode thickness, addition of conductive additives, use or non-use of electrolyte fusion, etc.

We claim:

1. An energy compression device comprising at least one bipolar element, said bipolar element comprising:
   (a) a negative electrode comprising a lithium alloy;
   (b) a positive electrode comprising an active material consisting essentially of CoS$_2$;
   (c) an inert electrolyte-containing separator consisting essentially of compacted particles of an inert electrically insulating material disposed between and in contact with said positive and negative electrodes;
   (d) an electrolyte comprising at least one lithium cation salt dispersed through said separator and in contact with said positive and negative electrodes; and,
   (e) means for collecting current discharged from said bipolar element.

2. The device of claim 1 wherein said lithium alloy of (a) comprises one or more of the group consisting of LiSi, LiAl, LiAlSi and LiAlFe.

3. The device of claim 1 wherein said negative electrode comprises about 75–80 volume percent powdered, pressed LiAl and the balance electrolyte.

4. The device of claim 1 wherein said electrolyte comprises at least one lithium halide.

5. The device of claim 4 wherein said electrolyte is selected from the group consisting of LiCl, LiF, LiBr, LiI and mixtures thereof.

6. The device of claim 1 wherein said positive electrode comprises about 40–90 weight percent CoS$_2$ and the balance said electrolyte.

7. The device of claim 1 wherein said separator has a thickness of less than about 25 mils and contains at least about 65 weight percent electrolyte.

8. The device of claim 7 wherein said separator thickness is between about 0.1 and 15 mils, inclusive.

9. The device of claim 8 wherein said separator thickness is about 8–9 mils.

10. An energy compression device comprising at least one bipolar element, said bipolar element comprising:
    (a) a negative electrode comprising a lithium alloy;
    (b) a positive electrode comprising an active material consisting essentially of CoS$_2$;
    (c) an inert electrolyte-containing separator comprising a mixture of an electrolyte and particles of an inert electrically insulating material and formed by compacting under a pressure of at least about 1500 lb/cm$^2$ disposed between and in contact with said positive and negative electrodes;
    (d) said electrolyte comprising at least one lithium cation salt dispersed through said separator and in contact with said positive and negative electrodes; and,
    (e) means for collecting current discharged from said bipolar element.

11. The device of claim 10 wherein said negative electrode comprises a porous body of a lithium alloy selected from LiSi, LiAl, LiAlSi and LiAlFe having said electrolyte dispersed therethrough and said positive electrode comprises a porous body formed of a major proportion of said active material consisting essentially of CoS$_2$ with said electrolyte dispersed therethrough.

12. The device of claim 7 wherein said separator comprises compacted particles of an inert compound filling 20 to 40 volume percent of the separator space.

13. The device of claim 12 wherein said inert compound is MgO, BN, or AlN.

14. The device of claim 1 wherein said device is adapted to be operated at a temperature of about 350° C. to 650° C.

15. The device of claim 1 wherein said current collection means are formed of molybdenum.

16. An energy compression device comprising a plurality of bipolar elements arranged in a stack within an enclosure, each said bipolar element comprising:
 (a) a negative electrode comprising a lithium alloy;
 (b) a positive electrode comprising an active material consisting essentially of $CoS_2$;
 (c) an inert electrolyte-containing separator consisting essentially of compacted particles of an inert electrically insulating material disposed between and in contact with said positive and negative electrodes;
 (d) an electrolyte comprising at least one lithium cation salt dispersed through said separator and in contact with said positive and negative electrodes; with
 (e) means for collecting current discharged from said bipolar elements disposed between and in electrical contact with the positive and negative electrodes of adjacent pairs of bipolar elements.

17. The device of claim 16 wherein said lithium alloy of (a) comprises one or more of the group consisting of LiSi, LiAl, LiAlSi and LiAlFe.

18. The device of claim 16 wherein said negative electrode comprises about 75–80 volume percent powdered, pressed LiAl and the balance electrolyte.

19. The device of claim 16 wherein said electrolyte comprises at least one lithium halide.

20. The device of claim 19 wherein said electrolyte is selected from the group consisting of LiCl, LiF, LiBr, LiI and mixtures thereof.

21. The device of claim 16 wherein said positive electrode comprises about 40–90 weight percent $CoS_2$ and the balance said electrolyte.

22. The device of claim 16 wherein said separator has a thickness of less than about 25 mils and contains at least about 65 weight percent electrolyte.

23. The device of claim 22 wherein said separator thickness is between about 0.1 and 15 mils, inclusive.

24. The device of claim 23 wherein said separator thickness is about 8–9 mils.

25. An energy compression device comprising at least one bipolar element, said bipolar element comprising:
 (a) a negative electrode comprising a lithium alloy;
 (b) a positive electrode comprising an active material consisting essentially of $CoS_2$;
 (c) an inert electrolyte-containing separator comprising a plurality of MgO solid strips spaced apart from one another and disposed between and in contact with said positive and negative electrodes;
 (d) an electrolyte comprising at least one lithium cation salt dispersed through said separator and in contact with said positive and negative electrodes; and,
 (e) means for collecting current discharged from said bipolar element.

26. An energy compression device comprising a plurality of bipolar elements according to claim 11 arranged in a stack within an enclosure with said means for collecting current discharged from said bipolar elements disposed between and in electrical contact with the positive and negative electrodes of adjacent pairs of bipolar elements.

27. The device of claim 22 wherein said separator comprises compacted particles of an inert compound filling 20 to 40 volume percent of the separator space.

28. The device of claim 27 wherein said inert compound is MgO, BN, or AlN.

29. The device of claim 16 wherein said device is adapted to be operated at a temperature of about 350° C. to 650° C.

30. The device of claim 16 wherein said current collection means are formed of molybdenum.

31. An energy compression device comprising at least one bipolar element, said bipolar element comprising:
 (a) a negative electrode comprising a porous body of a lithium alloy selected from LiSi, LiAl, LiAlSi and LiAlFe having an electrolyte dispersed therethrough;
 (b) a positive electrode comprising a porous body formed of a major proportion of an active material consisting essentially of $CoS_2$ with electrolyte dispersed therethrough;
 (c) an inert porous separator consisting essentially of compacted particles of an inert electrically insulating material disposed between and in contact with said positive and negative electrodes with electrolyte dispersed therethrough;
 (d) said electrolyte comprising at least one lithium halide; and,
 (e) means for collecting current discharged from said bipolar element.

32. The device of claim 31 wherein said negative electrode comprises about 75–80 volume percent powdered, pressed LiAl and the balance electrolyte.

33. The device of claim 31 wherein said electrolyte is selected from the group consisting of LiCl, LiF, LiBr, LiI and mixtures thereof.

34. The device of claim 31 wherein said positive electrode comprises about 40–90 weight percent $CoS_2$ and the balance said electrolyte.

35. The device of claim 31 wherein said positive electrode additionally contains a minor proportion of a metal sulfide which undergoes exothermic reduction during discharge of said device.

36. The device of claim 35 wherein said metal sulfide is selected from the group consisting of FeS, NiS and CoS.

37. The device of claim 31 wherein said separator has a thickness of less than about 25 mils and contains at least about 65 weight percent electrolyte.

38. The device of claim 37 wherein said separator thickness is between about 0.1 and 15 mils, inclusive.

39. The device of claim 38 wherein said separator thickness is about 8–9 mils.

40. The device of claim 37 wherein said separator comprises compacted particles of an inert compound filling 20 to 40 volume percent of the separator space.

41. The device of claim 40 wherein said inert compound is MgO, BN, or AlN.

42. The device of claim 31 wherein said device is adapted to be operated at a temperature of about 350° C. to 650° C.

43. The device of claim 31 wherein said current collection means are formed of molybdenum.

* * * * *